(12) United States Patent
Vigier et al.

(10) Patent No.: US 10,615,958 B2
(45) Date of Patent: Apr. 7, 2020

(54) COMMUNICATION UNIT, INTEGRATED CIRCUIT AND METHOD FOR CLOCK DISTRIBUTION AND SYNCHRONIZATION

(71) Applicant: NXP USA, Inc., Austin, TX (US)

(72) Inventors: Jean-Stephane Vigier, Mondonville (FR); Cristian Pavao Moreira, Frouzins (FR); Matthis Bouchayer, Toulouse (FR)

(73) Assignee: NXP USA, INC., Austin, TX (US)

(*) Notice: Subject to any disclaimer, the term of this patent is extended or adjusted under 35 U.S.C. 154(b) by 0 days.

(21) Appl. No.: 16/447,947

(22) Filed: Jun. 20, 2019

(65) Prior Publication Data
US 2020/0007309 A1 Jan. 2, 2020

(30) Foreign Application Priority Data
Jul. 2, 2018 (EP) .................................. 18305857

(51) Int. Cl.
*H04L 7/06* (2006.01)
*H04L 7/00* (2006.01)

(52) U.S. Cl.
CPC ............ *H04L 7/065* (2013.01); *H04L 7/0091* (2013.01)

(58) Field of Classification Search
CPC ..... H04L 7/0004; H04L 7/0008; H04L 7/065; H04L 7/0091; H04L 7/10
See application file for complete search history.

(56) References Cited

U.S. PATENT DOCUMENTS

| | | | |
|---|---|---|---|
| 6,209,072 B1 | 3/2001 | MacWilliams et al. |
| 6,775,328 B1 | 8/2004 | Segaram |
| 6,963,219 B1 | 11/2005 | Ghia et al. |
| 7,876,261 B1 | 1/2011 | Adams |
| 7,961,014 B2 | 6/2011 | Behel |
| 8,416,005 B2 | 4/2013 | Luo et al. |
| 9,031,180 B2 | 5/2015 | Rahul et al. |
| 2004/0190666 A1 | 9/2004 | Aiello et al. |
| 2005/0018762 A1 | 1/2005 | Aiello et al. |
| 2008/0123792 A1 | 5/2008 | Prete et al. |

(Continued)

OTHER PUBLICATIONS

EP Patent Appln. No. 18305856.9, 26 pgs., (Jul. 2, 2018).

(Continued)

*Primary Examiner* — Siu M Lee
(74) *Attorney, Agent, or Firm* — Rajeev Madnawat

(57) ABSTRACT

A communication unit (400, 500) is described that includes a plurality of cascaded devices that comprise at least one master device and at least one slave device configured in a master-slave arrangement and configured to process at least one of: transmit signals, and receive signals. The at least one master device includes: a clock generation circuit configured to output a system clock signal; a modulator circuit (562) coupled to the clock generation circuit and configured to receive the system clock signal and a frame start signal and embed the frame start signal into the system clock signal to produce a modulated embedded master-slave clock signal (584); and transmit the modulated embedded master-slave clock signal (584) to the at least one slave device to synchronise the system clock signal and the frame start signal between the at least one master device (510) and at least one slave device (520).

13 Claims, 10 Drawing Sheets

(56) References Cited

U.S. PATENT DOCUMENTS

| | | | |
|---|---|---|---|
| 2009/0322335 A1* | 12/2009 | Adachi | G01R 33/3692 |
| | | | 324/318 |
| 2018/0024233 A1* | 1/2018 | Searcy | G01S 7/032 |
| | | | 342/125 |
| 2018/0115409 A1* | 4/2018 | Nayyar | H04J 3/0685 |

OTHER PUBLICATIONS

EP Patent Appln. No. 18305861.9, 40 pgs., (Jul. 2, 2018).
EP Patent Appln. No. 18305860.1, 48 pgs., (Jul. 2, 2018).
EP Patent Appln. No. 18305858.5, 38 pgs., (Jul. 2, 2018).

* cited by examiner

FIG. 1 – Prior Art

COMMUNICATION UNIT, INTEGRATED CIRCUIT AND METHOD FOR CLOCK DISTRIBUTION AND SYNCHRONIZATION

CROSS-REFERENCE TO RELATED APPLICATIONS

This application claims the priority under 35 U.S.C. § 119 of European Patent application no. Application No. 18305857.7, filed on Jul. 2, 2018, the contents of which are incorporated by reference herein.

FIELD OF THE INVENTION

The field of the invention relates to a communication unit, such as a radar unit, that includes a distributed master-slave arrangement and methods for clock distribution and synchronization. The invention is applicable to, but not limited to, a radar unit for, say, an automotive application, and method therefor.

BACKGROUND OF THE INVENTION

There has been an increased demand for active safety systems for vehicles. Active safety systems require multiple radar sensors per vehicle, each radar sensor typically working with a specific radar technology. In an automotive application, the radar sensors are mostly built using a number of integrated circuits (ICs), sometimes referred to as 'chips'. The current trend is towards offering a radar system on chip (SoC), using a radio frequency (RF) complementary metal-oxide-semiconductor (CMOS) process technology) solution in order to reduce cost and power consumption.

Frequency-modulated continuous wave (FMCW) radar sensors transmit frequency modulated signals, and radar receivers substantially simultaneously receive their echo. The received echo is then mixed with the transmitted signal and results in a low frequency signal having a frequency of:

$$Fb = \frac{2 \times \text{Range}}{c} \times \frac{\text{Modulation } BW}{\text{Ramp duration}} \quad [1]$$

at the output of the mixer, the so-called beat frequency (Fb). By analysing the beat frequency, the range parameter (i.e. a distance to targets) can be extracted.

Commercial automotive radar sensors typically include multiple receivers and transmitters (the combination of which is referred to as transceivers (TRx)). A microcontroller (MCU) performs digital control of the transceiver circuits and digital signal processing of the digitized data (e.g. fast fourier transform (FFT) and digital signal processing) in order to output processed radar data to the MCU of the vehicle.

Next generation high performance radar solutions used for highly automated or fully autonomous driving will need to comply with stringent radar angular resolution requirements in both azimuth and elevation. Angular resolution is directly related to the radar system number of receiver antennas and their location with respect to each other. Current monolithic radar transceiver ICs are typically constrained to contain only a few transceiver channels, as the complexity and cost and heat dissipation problems of integrating more transceiver channels on the same chip increases substantially with the number of ICs that are included.

To allow increased angular resolution in both azimuth and elevation, a multi-chip set solution with a master device and several slaves may be used, as illustrated in FIG. 1. In this illustration, a known radar unit cascades two radar TRx chips. One of the radar TRx chips is defined as the master device 110, which contains a first set of transmitter circuits coupled to transmit antennas 112 and a first set of receiver circuits coupled to receive antennas 114. The master device 110 (or IC) provides a number of signals 130 to one or more slave device(s) 120. In this way, master and several slaves are cascaded coherently to increase the number of transmit and receive channels, thereby enabling an increase in sensor accuracy to improve angle resolution.

Each master device 110 and slave device 120 embeds several receiver and transmitter channels, and a microcontroller unit (MCU) is used to combine all received data from all receivers, as well as to control and program the master device 110 and slaves devices 120. The master device 110 is arranged to distribute the Local Oscillator (LO) signal 140 off-chip through transmission lines on the printed circuit board (PCB) 100 to other radar chips (in this case the one other TRx chip functioning as a slave device 120). The LO signal 140 is used for the different transmitters and receivers, and is typically star-routed (i.e. routed via equal length paths) to each device to guarantee the same delay and exact phase coherence between all devices (which are sometimes separate ICs). The slave device 120 (and further slave device(s) 123) contains a second set of transmitter circuits coupled to transmit antennas 122 and a second set of receiver circuits coupled to receive antennas 124.

The distribution of the LO signal 140 from the master device 110 ensures that the slave device 120 is also able to use the LO signal 140, and thereby ensure that the transmitting signal frequency and the clock frequency of the down mixer of different radar TRx are the same. The LO signal 140 is used by all devices (including the master device 110 wherein the LO signal 140 is routed out of the master device 110 and thereafter back into the master device 110. Typically, in master-slave arrangements, the LO signal 140 is routed with symmetrical PCB lengths in order to ensure that all receivers (encompassing a respective down mixer) in each master device 110 and slave device(s) 120, 123 of the system receive the same LO with same phase. Phase coherence is mandatory for cascaded systems. Other control signals may be synchronized with a lower speed clock, for example an analog-to-digital converter (ADC) clock, which may be used across multiple ICs/devices.

The master device 110 is coupled to the MCU 160, which includes various interfaces, such as a serial-parallel interface (SPI) 162, a general purpose data input-output port 170, a ramp frame start (RFS) circuit 168, as well as a MCU clock interface 164, this clock signal 165 generally provided by the master device 110.

The RFS signal can be either (i) generated and distributed by the MCU 160, through a dedicated pin on both the MCU 160 (RFS_out) and a single pin on master device(s) 110 and slave device(s) 120, 123 (RFS_in) or (ii) generated and distributed by the master device 110, where there is no pin needed for MCU 160 in this case.

In the first known architecture (i), as illustrated in FIG. 1 and which is the predominant architecture used in most current master-slave arrangements, RFS circuit 168 generates a RFS signal 166 that is used to trigger a starting point of modulation timing engines within each master device and slave device. The RFS signal 166 is generated by the MCU 160 and requires at least one dedicated MCU pin. The RFS can also be generated by the master device 110, through a SPI command from MCU 160 via RFS signal 140. In this case, generally two pins are needed in the master device 110 (to support RFSout, RFSin) and one pin in each slave device (RFSin) in order to allow a star distribution that is preferred to ensure a good symmetry of RFS signal. However, even using star connected PCB routing in the first architecture (i), perfect time alignment of frame start inside master device(s) 110 and slave devices 120, 123 is not possible because the MCU 160 and master device(s) 110 and slave devices 120, 123 are not synchronized, e.g. they are subject to different pad delays, no control on timing generation of RFS from MCU time engine, etc.

In the second known architecture (ii), when the RFS is generated from the master device 110: the signal to start the generation of RFS comes from a SPI command from the MCU 160. Thus, no RFS at the MCU side is needed in this case. The RFS is then generated by the master device 110. The connection from master device 110 to slave devices 120, 123 for routing that RFS signal can be performed in two different ways:

(a) a not star connected manner using a single pin on each master device 110 and slave device(s) 120, 123, so no alignment is possible: and
(b) in a star connected manner whereby two pins (RFS_out and RFS_in) are used in the master device 110, and a single pin (RFS_in) used in each in slave device(s) 120, 123. This star routing ensures the symmetry of the RFS signal length in all chips, and thereby achieves a good alignment of chirp start signal (frame start). However, the inventors have recognised that this alignment is not sufficient to ensure the ADC clocks (i.e. the M/S clocks on each master device 110 and slave device(s) 120, 123) and RFS signal are synchronized between each other.

A master-slave (MS) clock signal 142 is generated by the master device and used as a time base for synchronization of the microcontroller time based events with any other master device and all slave devices 123. The connection to the MCU 160 consists of SPI control lines 163 and digital data line signals from all the ICs back to the MCU 160 for later signal processing, in a given data format (e.g. Mobile Industry Processor Interface Camera Serial Interface (MIPI CSI-2), low voltage differential signalling (LVDS) or other formats).

The cascading master-slave (MS) clock signals (MS_clkP, MS_clkN) 142 are specifically used for time based synchronization of the sampling moments on the ADCs of several master and slave devices.

For optimal operation of distributed radar systems, it is important that these signals (LO 140, MS clock signal 142 and RFS signal 166) are synchronous across all receiver circuits on different devices. This means that, after calibration of the phase difference between all receiver channels in all master and slave devices, the voltage supply Vcc, temperature and aging variation between all devices distributed in the PCB should not change the initial clock alignment, for example after a one-time calibration operation is performed at radar module level.

A primary problem with such cascaded systems is clock distribution and synchronization. Problems arise due to any misalignment between clock valid and frame start timings between master device and slave device(s), due to different printed circuit board (PCB) delays between components, devices, circuits. This problem is typically overcome by adopting a MS clock distribution process in a star-connection architecture, in order to guarantee the same transmission line lengths and therefore a good clock alignment between the components, devices, circuits. The star-connection architecture is also required for the LO signal to achieve phase coherence when all the TRx channels are used as one antenna array. The requirement to adopt a star-connection architecture for all common signals (LO signal, MS clock, etc.) imposes severe constraints on the PCB design. A common and synchronised phase reference is particularly important in a distributed radar phased array design, in order to steer a beam and control a radiation pattern for the phased array system.

Synchronised clock signals are also used to sample data inside the ADCs of each device. In an FMCW radar device, the synchronized clock edges are used to sample data and control signals that are used to start the modulation. Here, the RFS signal across all devices must be synchronized. This alignment is needed to avoid sampling valid data at different times/moments in the master and slave devices, which would create phase errors between devices and consequently compromise radar system performance.

Even when adopting a star-connection architecture, a problem occurs when the RFS signal edge is close to a MS clock edge. Particularly in response to processing, voltage or temperature (PVT) variations, a master device and one or more slave device(s) may observe RFS re-timed at a different clock edges. This means that for an intermediate frequency (IF) of, say, IF=20 MHz, an error of a complete 240 MHz MS clock cycle can happen. This leads to a phase error of around +/−15 degrees, which compromises radar angular resolution. Modern imaging radar systems specifications allow a maximum of +/−3 degrees of phase error, and this considers errors due to combined ADC sampling and receiver channel variations, as well as some PCB asymmetries. This translates to a stringent required synchronization time accuracy of around 416 psec., for a maximum intermediate frequency (IF) of 20 MHz.

LVDS is a technical standard that specifies electrical characteristics of a differential, serial communications protocol. LVDS operates at low power with programmable output amplitude of voltages and can run at very high speeds using inexpensive twisted-pair copper cables. FIG. 2 illustrates a known, classical LVDS communication link 200, that includes an LVDS transmitter 205 The LVDS transmitter 205 (or driver) provides a constant output current (e.g. 3.5 mA) generally terminated by a 100 ohm accurate external differential load termination 215. The LVDS transmitted signal 220 is a differential signal that is received by the LVDS receiver 210 and converted in general to a single ended CMOS output 225 that is used as a clock within circuits inside the LVDS receiver 210.

FIG. 3 illustrates a more detailed circuit diagram of the conventional LVDS transmitter 205 of FIG. 2. The LVDS transmitter 205 (or driver) provides a constant output current (e.g. 3.5 mA) generally terminated by a 100 ohm accurate external differential load termination 215. The conventional LVDS transmitter 205 employs a regulation loop 310 that outputs differential voltages (positive and negative bias voltages 315, 325) and a common mode voltage 320 to a switched LVDS circuit 330. In such a conventional LVDS transmitter 205, there is no specific attention made on timing constraints (e.g. settling time) of the circuit, or in a master-slave device architecture, no consideration of synchronization when switching amplitude levels. Indeed, the output of the conventional LVDS transmitter 205 only changes by directly changing the output current itself, and this change takes some time to recover from current overshooting, due to the intrinsic output common mode loop reaction time. This limitation does not support fast transitions and presents too much delay variation. Consequently, such architectures, in their present form, cannot be used in cascaded radar systems.

U.S. Pat. No. 6,775,328 B1 proposes a feedback synchronization loop using mV input-output drivers and receivers, U.S. Pat. No. 9,031,180 B2 provides synchronization via a protocol (data frame) in wireless transmitters, U.S. Pat. No. 7,876,261 B1 proposes synchronization between devices using reflected wave clock synchronization. U.S. Pat. No. 6,209,072 B1 uses a de-skewing latch technique in order to obtain a synchronous interface between master device and slave devices. Each of these known techniques is complex and/or require further components and circuits, thereby requiring valuable PCB space and increased cost.

Thus, a mechanism is needed to better support synchronization between shared clocks signals (that use a master-slave clock) and a ramp frame start (RFS) signal in radar units that use multiple radar devices or ICs.

SUMMARY OF THE INVENTION

The present invention provides a communication unit, such as a radar unit, an integrated circuit and methods for clock distribution and synchronization in a master-slave arrangement, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
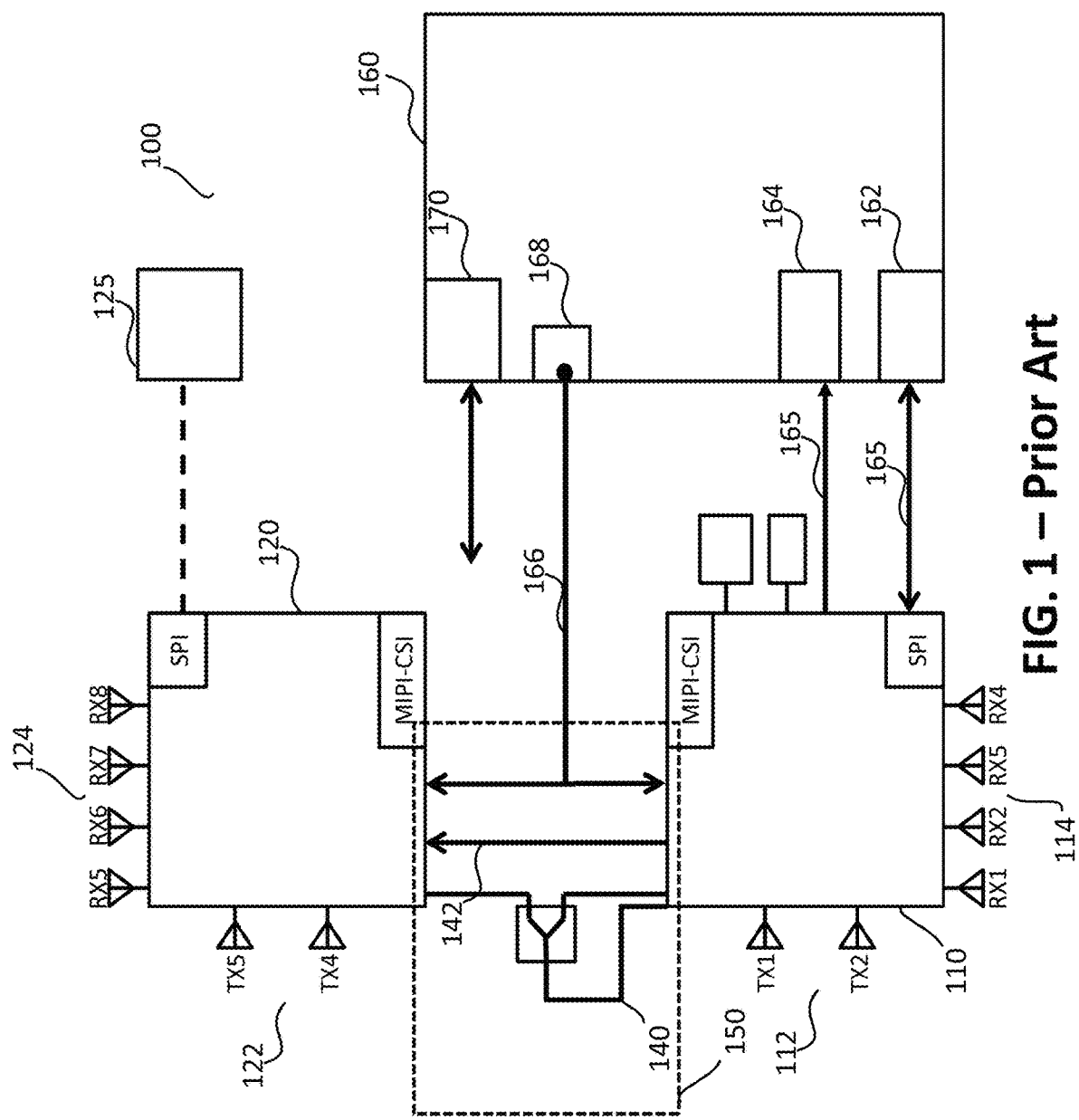
FIG. 1 illustrates a block diagram of a known radar unit that cascades two radar TRx chips.
Figure 2:
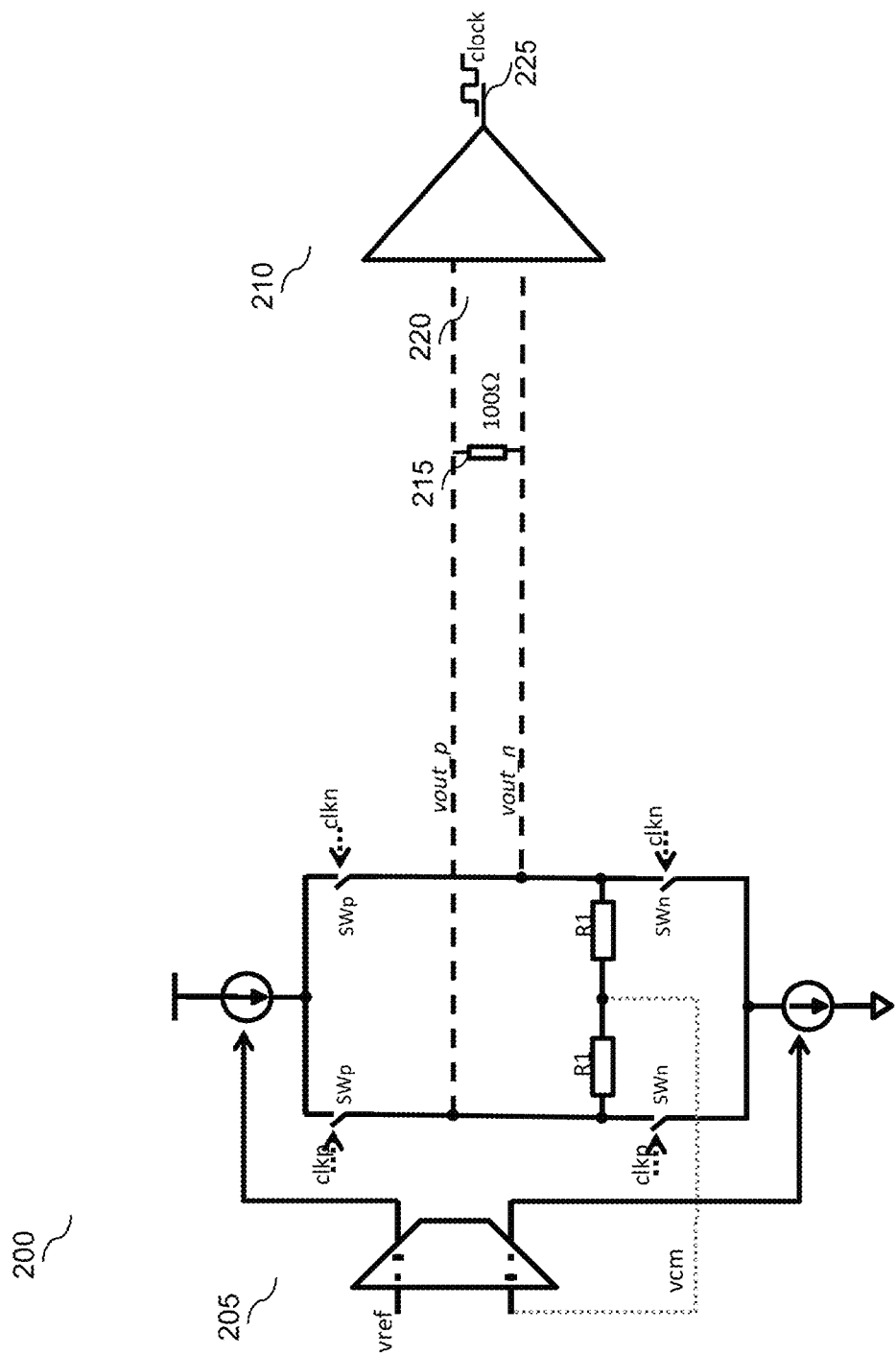
FIG. 2 illustrates a classical LVDS communication link.
Figure 3:
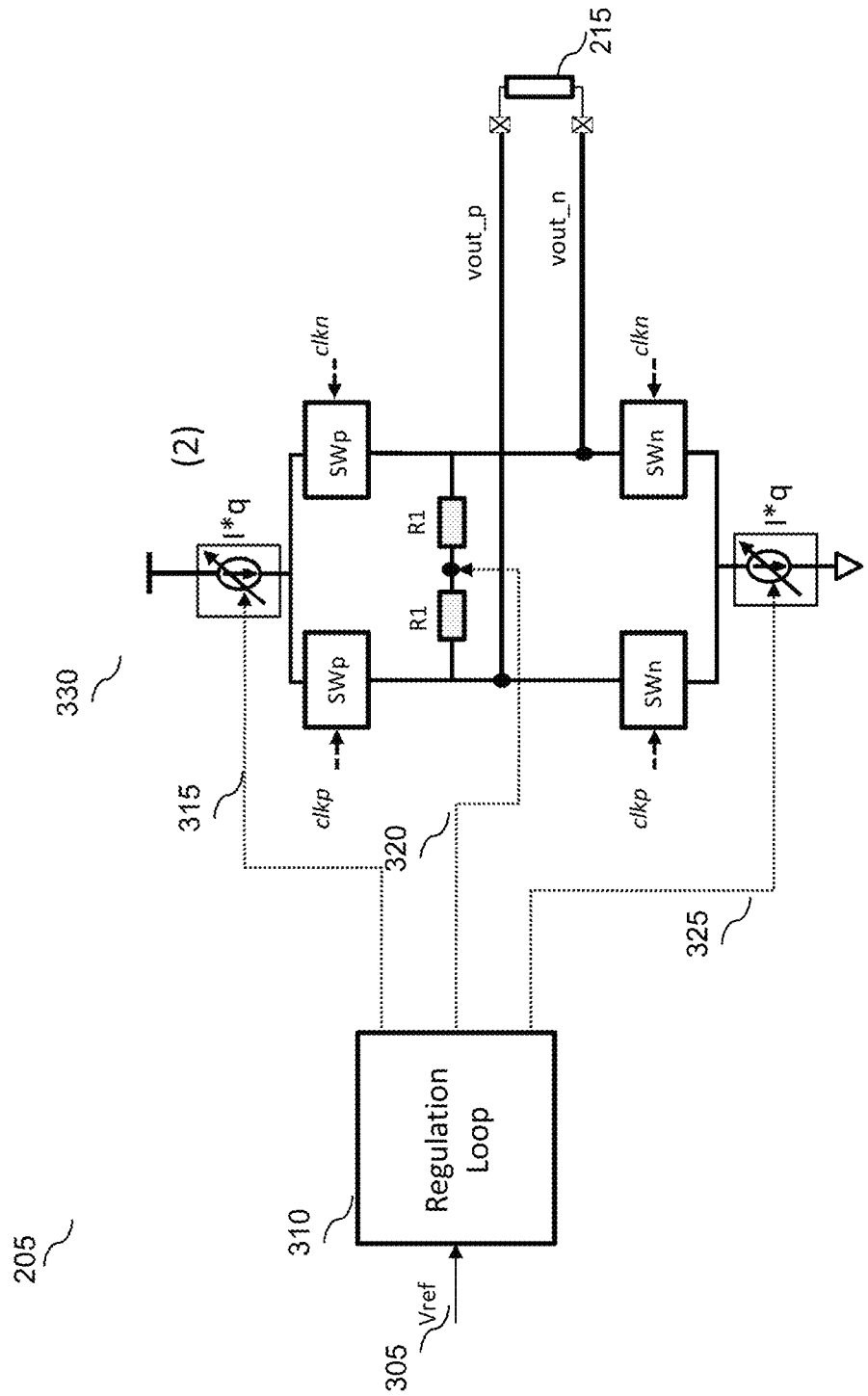
FIG. 3 illustrates a known LVDS transmitter circuit.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

To address the aforementioned synchronization problem between multiple devices or ICs within a communication unit, such as a radar unit, examples of the present invention propose a design to embed a frame start signal, such as a chirp start signal (RFS) of a radar unit, within the clock signal. Thereafter, the embedded signal may be shared between the master device(s) and slave device(s) (or ICs) in order to maintain synchronization that is significantly less reliant on PCB construction. Advantageously, the technique to embed a chirp start signal within the distributed master-slave clock signal (sometimes referred to as an ADC clock) enables the slave device(s) (and any other master device(s)) to readily and easily demodulate the distributed master-slave clock signal in order to obtain concurrently the chirp start (RFS). Thus, the master-slave clock distribution and the timing alignment between the master-slave clock signal and the RFS across all devices is inherently synchronized.

Such a technique benefits from the fact that the master-slave clock signal is quasi-perfectly synchronized (when using a star routed PCB) and delays of clock edges between different devices during voltage or temperature variations (once offset is calibrated) are minimal, e.g. less than one clock cycle error. Thus, in some examples, embodiments of the invention enable a designer to implement a digital cascading radar solution with increased phase aligned performance, where a single reference oscillator (e.g. phase locked loop (PLL)) may be used for all master and slave devices (supplying a reference frequency/clock and a main PLL frequency clock), thereby facilitating phase coherence, clock alignment and clock and RFS synchronization throughout the communication units.

Some examples of the invention enable the RFS signal (ramp frame start or chirp start) to be generated in the master device for synchronicity purposes, and not in the MCU as adopted in known communication units. This approach advantageously removes a need for a dedicated pin in the MCU and removes an additional routing constraint of this signal in the PCB, because the RFS signal is embedded within the distributed MS clock. In this example, the embedding of the RFS signal into the master-slave clock signal (thereby facilitating a distribution of the two signals with effectively no delay between the clock edges of each within the devices), may be achieved using a RFS modulator and a RFS demodulator, implemented in the master-slave clock distribution transmit and receive circuits, respectively.

Some examples of the invention may employ low-voltage differential signalling (LVDS), also known as TIA/EIA-644, in order to assist the modulation and demodulation of the embedded clock signal and chirp signal (i.e. low-to-high or high-to-low transitions) to provide synchronicity across different master device(s) and slave devices. In some examples, LVDS may be employed in order to reduce interference or signal pollution between supplies, due to current spikes, if CMOS logic were used. Some examples of the invention may take advantage of the fact that LVDS amplitude levels ($V_{diff}$) can be programmed, for example by programming a LVDS transmitter current value ($V_{diff}=2*Idc\_tx*R_{load}$), assuming a constant 100 ohms termination load ($R_{load}$) placed in each LVDS receiver.

In examples of the invention, a mechanism is described to time encode information (e.g. embed a frame start signal, such as a RFS signal in a radar unit), in a master-slave clock signal) using a multi-level or amplitude modulated driver in a master device. In some examples, a single-ended design may be used, in contrast to a differential design. In this manner, additional information is distributed on the top of a conventional transmission, with different possible signal levels and different pulse widths of signals both being representative of such additional information. In examples of the invention, a single LVDS transmitter employed in a master device is used to drive several LVDS receivers placed in one or more slave device(s) as well as the master device itself and/or one or more other master device(s). As a consequence, the output current of the single LVDS transmitter may be programmable, according to a number of termination loads (from both LVDS slave device receivers and LVDS master device receivers) are used, e.g. for signal integrity reasons.

At the LVDS receivers, it is important to ensure that a minimum signal amplitude level of the embedded signal is provided in order to not degrade phase noise (or jitter) when translating a received signal from a differential to CMOS single-ended form (which is needed to create a useable clock signal). Therefore, according to the number of termination loads (N) (e.g. slave devices) employed in the system, as well as the load resistance ($R_{load}$) of the master device modulator, examples of the invention propose a 'flexible' differential or single-ended transmitter that is able to provide the appropriate current value (I=Itx*N), ensuring that the amplitude on each receive signal (received by each RFS demodulator of slave device(s) and/or master device(s)) is as expected (VRXse=$I*R_{load}/N$). In addition, in some examples, the current value ('I') may be divided into (k*I) and (1−k)*I, which will provide a low amplitude value (A min) and a high amplitude value (A max) in the transmitted embedded signal, as explained below.

In some examples of the invention, a master device modulator circuit with an in-phase transition between low-to-high output current is described, whereby the transition edge is representative of an embedded chirp start signal, which will be used in the demodulator to retrieve the chirp start signal aligned at all master device(s) and slave devices.

In some examples of the invention, a master device modulator circuit is described that employs two (or more) parallel drivers with a complementary relationship there between. In some examples, this relationship (or ratio) may be representative of a ratio between maximum and minimum output current of the modulator circuit. In some examples of the invention, the two (or more) parallel drivers may be configured to control (or program) an absolute value of the output currents, thereby keeping a ratio between the maximum and minimum output current values as a constant. This is advantageous because in a LVDS receiver the maximum voltage $V_{max}$ needs to be above a certain level in order to not degrade the LVDS receiver phase noise, and above a minimum value in order to be able to detect the low to high transition (when demodulating the embedded RFS signal).

Thus, examples of the invention may facilitate digital cascading radar units with increased phase aligned performance, where a single reference PLL may be used in a clock signal generation with embedded frame alignment of frame start signals within a MS clock for distribution between all master and slave devices. This may ensure optimized phase coherence, sampling clock and chirp start signal alignment, which reduces system phase error, thereby allowing accurate range resolution.

Although examples of the invention are described with reference to synchronization in a star-connected master-slave architecture for a radar unit, it is envisaged that, in other examples, the techniques described herein may be applied to any kind of communication unit or system where several devices or ICs share the same sampling timing, and where another signal may be sent and received embedded within the clock, but synchronous to it (in this example radar scenario, this signal is the 'chirp start' signal).

Although examples of the invention are described with reference to a use of cascaded integrated circuits for, say, a phased array vehicular radar system with many transceiver circuits not located in a same IC, it is envisaged that the examples herein described may equally be employed in a phased array system for general wireless communication applications and units, such as base stations.

Next generation radar solutions will be based on a multi-chip transceiver configuration where a master device and several slave devices are cascaded coherently to increase the number of transmitter and receiver channels, thereby increasing sensor accuracy in angle resolution. Digital cascading is a preferable solution in order to circumvent the limitation of analog cascading in terms of misalignment of sampling clock of the ADCs and modulation ramp start signal (RFS) between different radar chips.

Examples of the invention describe a communication unit, an integrated circuit and method of operation that includes a plurality of cascaded devices that comprise at least one master device and at least one slave device configured in a master-slave arrangement and configured to process at least one of: transmit signals, and receive signals. The at least one master device includes: a clock generation circuit configured to output a system clock signal; a modulator circuit coupled to the clock generation circuit and configured to receive the system clock signal and a frame start signal and embed the frame start signal into the system clock signal to produce a modulated embedded master-slave clock signal; and transmit the modulated embedded master-slave clock signal to the at least one slave device to synchronise the system clock signal and the frame start signal between the at least one master device and at least one slave device.

Figure 4:
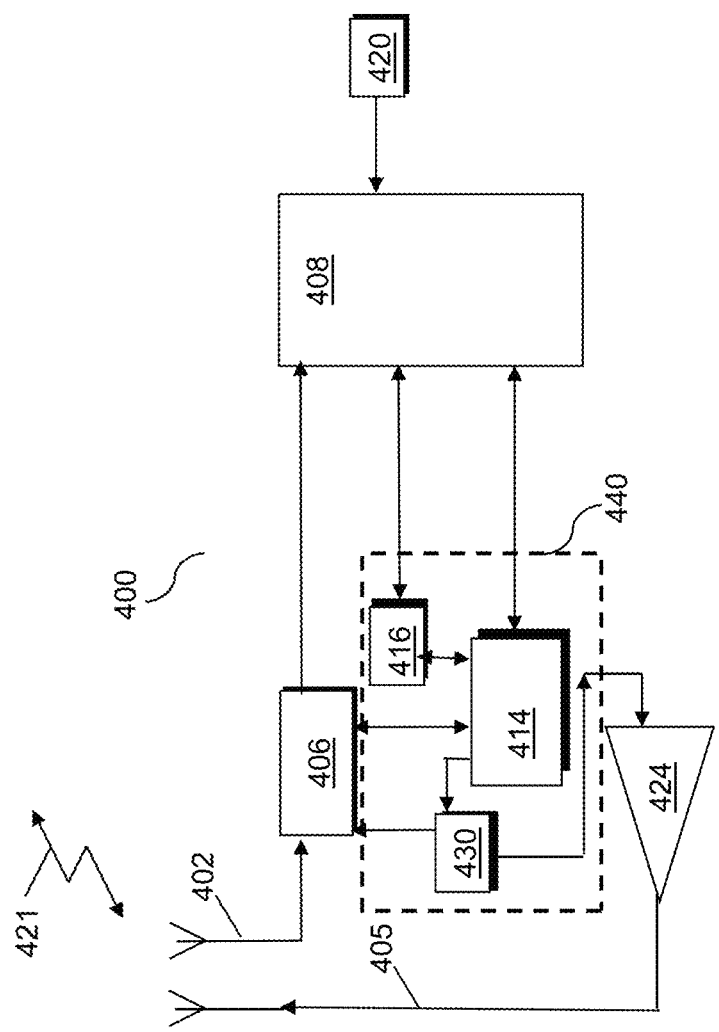
FIG. 4 illustrates an example block diagram of a radar unit adapted according to example embodiments of the invention.

Referring to FIG. 4, a block diagram of an example wireless communication unit is shown, adapted in accordance with some examples of the invention. Purely for explanatory purposes, the wireless communication unit is described in terms of a radar unit 400, for example operating at millimeter wave (mmw) frequencies. However, in other examples, it is envisaged that the concepts described herein may be employed in any communication unit that utilizes a master-device-slave device arrangement.

The radar unit 400 contains one or several antennas 402 for receiving radar signals 421, and one or several antennas 403 for transmitting radar signals, with one shown for each for simplicity reasons only. The number of antennas 402, 403 used may depend on the number of radar receiver and transmitter channels that are implemented in a given radar device. One or more receiver chains, as known in the art, include receiver front-end circuitry 406, effectively providing reception, frequency conversion, filtering and intermediate or base-band amplification, and finally an analog-to-digital conversion. In some examples, a number of such circuits or components may reside in signal processing module 408, dependent upon the specific selected architecture. The receiver front-end circuitry 406 is coupled to the signal processing module 408 (generally realized by a digital signal processor (DSP)). A skilled artisan will appreciate that the level of integration of receiver circuits or components may be, in some instances, implementation-dependent.

The microcontroller unit (MCU) 414 maintains overall operational control of the radar device 400, and in some examples may comprise time-based digital functions (not shown) to control the timing of operations (e.g. transmission or reception of time-dependent signals, FMCW modulation generation, etc.) within the radar unit 400. The MCU 414 is also coupled to the receiver front-end circuitry 406 and the signal processing module 408. In some examples, the MCU 414 is also coupled to a memory device 416 that selectively stores operating regimes, such as decoding/encoding functions, and the like.

As regards the transmit chain, this essentially comprises a power amplifier (PA) 424 coupled to the transmitter's one or several antennas 403, antenna array, or plurality of antennas. In radar unit 400, radar transceiver topology is different from traditional wireless communication architectures (e.g. Bluetooth™, WiFi™, etc.), as modulation occurs within a phase locked loop (PLL) (typically via a fractional-N divider), and is applied directly to the PA 424. Therefore, in some examples, the receiver front-end circuitry 406 and transmitter PA 424 are coupled to frequency generation circuit 430 arranged to provide radio frequency (RF) local oscillator (LO) signals. The generated RF LO signals are thus modulated directly to generate transmit radar signals, and also used to down-convert received modulated radar signals to a final intermediate or baseband frequency or digital signal for processing in a receive operation.

In examples of the invention, digital cascading of multiple master and slave devices is achieved by sending a reference clock signal generated in a master device to both other master device(s) and one or more slave device(s). In examples of the invention, the reference clock signal has been adapted by embedding a start of a frame (RFS) indication in the clock signal, which in some examples is a master-slave clock signal. In some examples, the generation and distribution of the MS clock signal with an embedded start of a frame indication may be implemented via a star connected LVDS link, for example to reduce PCB skew and reduce signal reflections that could compromise signal integrity and increase jitter.

To remove any misalignment between RFS and the MS clock signal, as well as relax PCB requirements on the RFS signal, examples of the invention embed the RFS (sometimes referred to as a modulation chirp start) inside the master-slave clock signal, by adding an RFS modulator in a LVDS transmitter for generating a reference clock, which is a focus of the present description, and by adding an RFS demodulator at a LVDS receiver side. Thereafter, for example, amplitude modulation/demodulation may be used to retrieve the RFS signal, advantageously without a need for one or more dedicated RFS pin(s).

In accordance with examples of the invention, the use of improved synchronization between respective master device(s) and one or more slave device(s) may then allow correct operation of the communication unit, e.g., that implements an N-unit phased array FMCW imaging radar system. For identical units, the use of a phased array increases the sensitivity by 'N' times, as compared to that of a single unit. In a radar transmitter mode of operation, beam steering can also be implemented by shifting the phase of the transmitting signals of an N-unit phased array radar system. For multiple mid-range radar units, the inputs to an N-unit phased array radar system can be combined in order to increase the radar transmit power, and thereby allow longer range applications. Such benefits may result from the use of improved synchronization between respective master device(s) and one or more slave device(s).

In one example of the invention, the embedding of a chirp start signal within a clock signal, which is shared between the master device(s) and slave device(s) (or ICs) in order to maintain synchronization, may result in an enabling of more flexible PCB design without the constraints of a strict transmission line or connection length between the master device(s) and slave device(s). Furthermore, a smaller MCU for, say, a phased array FMCW imaging radar system, may be achieved by eliminating a need for an additional one pin on MCU (when the RFS is provided by the MCU in the known architecture (ii)) or two dedicated RFS pin(s) on the master device (when the RFS is provided by the master device in known architecture (i)).

Some examples of the invention employ synchronization in order to minimize any delay mismatch in either the LO/frequency generation circuitry and/or analog-to-digital converter (ADC) sampling instants (which would ordinarily have led to angle estimation errors) as well as transmit control, frequency chirp start control signals. Examples of the invention employ synchronization in an FMCW radar unit, particularly to align the frequency chirp start and end frequencies.

Furthermore, examples of the invention allow multiple radar transceiver chips to be located on different PCBs or modules in order to reduce installation complexity in a constructing of an adaptive phased array FMCW imaging radar system on a non-planar vehicle surface. Clearly, the various components within the radar unit 400 can be realized in discrete or integrated component form, with an ultimate structure therefore being an application-specific or design selection. A skilled artisan will appreciate that the level of integration of circuits or components may be, in some instances, implementation-dependent.

Figure 5:
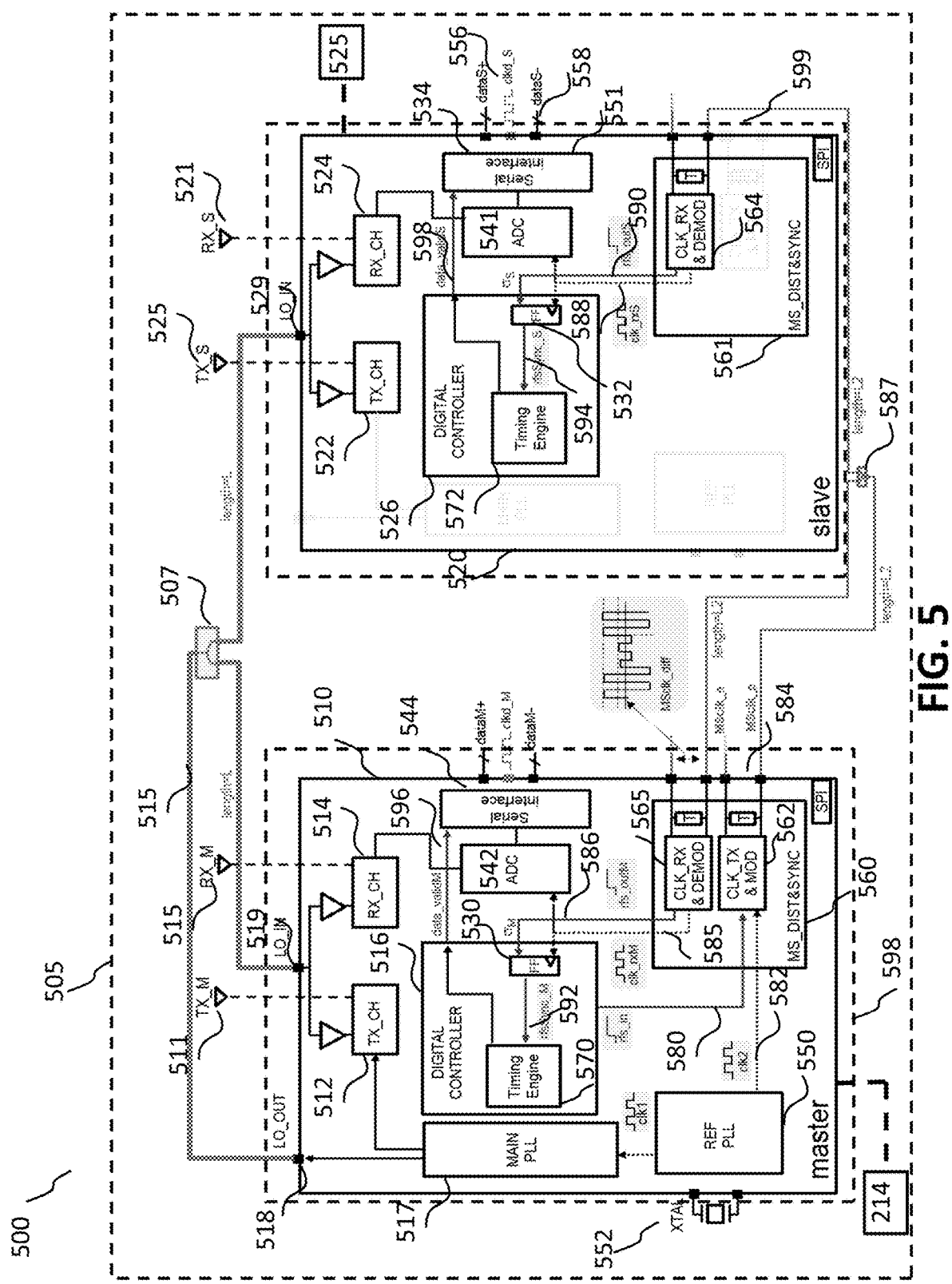
FIG. 5 illustrates an example diagram of a radar unit that cascades multiple chips in a Master Slave synchronization approach, according to example embodiments of the invention.

Referring now to FIG. 5, an example block diagram of a communication unit 500 having a master-slave architecture is illustrated. In this example, the master-slave architecture is illustrated as a radar unit 505 that includes a master device 510 and one or multiple slave devices 520, 523. One slave device 520 is shown for clarity purposes only, with the potential for other similar slave devices shown as 523.

In this example, the master device 510 incorporates a radar transceiver formed by at least a frequency generation circuit, which in this example includes a reference phase locked loop (PLL) 550 and a main PLL 517. An output from the main PLL 517 provides a local oscillator (LO) signal to a local oscillator output pin 518, which is routed via a LO_out path 515 to a RF splitter 507 that is coupled to each master and slave LO input pin (LO_in) 519, 529 via, say, an equal transmission line length (e.g. via a star configuration). In some examples, by using equal transmission line lengths, it is possible to ensure equal delay and phase aligned signals for the LO, applied across all master device(s) 510 and slave devices 520, 523 for the generation and reception of radar signals.

The master device 510 further includes a digital controller 516 and a transmitter circuit 512 comprising one to several transmitter channels (TX_CH), which include various transmitter circuits such as up-mixers, transmitter chain amplifiers and a power amplifier, and a receiver circuit 514 comprising one to several receiver channels (RX_CH), which include various receiver circuits such as low noise amplifiers, down-mixers, filters, variable gain amplifiers, etc. In a transmitter mode of operation in the master device 510, the digital controller 516 may provide a transmit radar signal to the main PLL 517 to generate a modulated transmit signal. The modulated transmit signal is then optionally passed to a buffer or frequency multiplier in the transmitter circuits 512, 522 (if the generated signal is not at the operating frequency of the radar unit 505) of the respective master device(s) 510 and slave device(s) 522. A high-frequency output of the transmitter circuit 512 is passed to a power amplifier, say, via a phase shifter circuit (both not shown), where it is amplified within transmitter circuit 512 and routed to the one or more transmitter antenna(s) 511 (and in some examples routed to the one or more transmitter antenna(s) 525 in the one or more slave device(s) 520.

In a receiver mode of operation in the master device 510 and slave device 520, a received radar signal may be received at the one or more receiver antenna(s) 513, 521 and passed to master and slave receiver circuits 514, 524 that include a low noise amplifier (LNA) configured to amplify the received radar signal. The amplified received radar signal is passed to a down-mixer, where it is mixed with the received high-frequency LO signal 515 received from the master device 510.

The master device 510 further includes one or more programmable bandpass filter(s) and one or more gain amplifiers (not shown), as well as one or several ADC(s) 542 that is/are coupled to the one to several receiver channels (RX_CH) 514 as well as a serial interface 544. The one or several ADC(s) 542 process a relative narrow band signal, for example in a range between a few kHz up to tenths of MHz.

Figure 8:
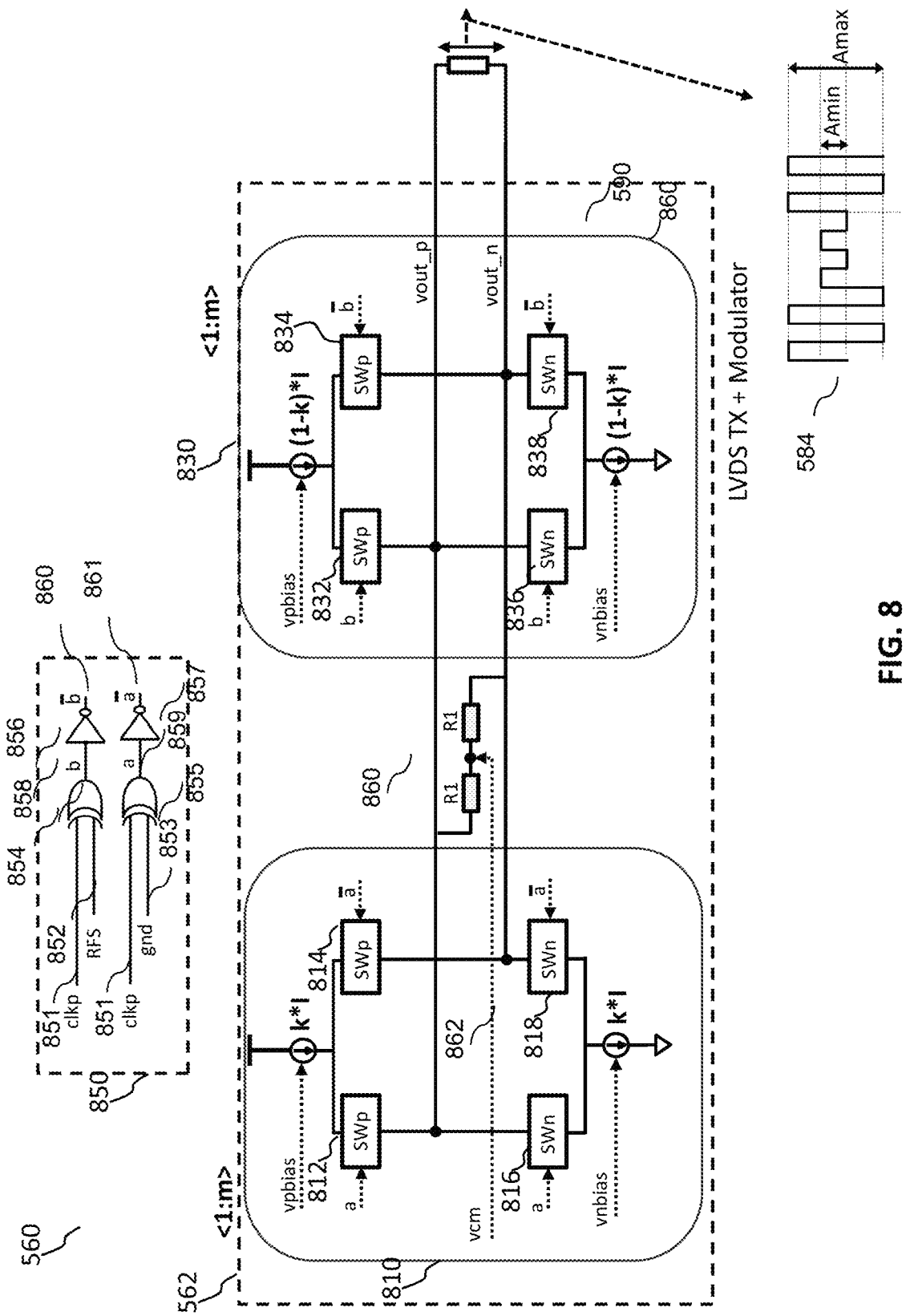
FIG. 8 illustrates an example LVDS transmitter and modulator configured to embed a RFS signal (such as a Chirp Start) into a clock signal (such as a master-slave clock signal), according to example embodiments of the invention.

As described in greater detail with respect to FIG. 8, and in accordance with examples of the invention, the master device 510 further includes a master-slave clock distribution and synchronization circuit 560. In this example, the reference clocks are generated on the master device 510 using the reference PLL 550, tied to an external crystal oscillator 552, and sent as a first clock signal (clk1) to the main PLL 517 and a master-slave clock signal (clk2) 582 to master-slave clock distribution and synchronization circuit 560.

In this example, the master-slave distribution and synchronization circuit 560 is configured to embed a frame start signal, such as a chirp start (RFS_in) signal 580 in a radar unit, into the master-slave clock signal (clk2) 582 received from reference PLL 550. Embedding the chirp start (RFS_in) signal 580 into the master-slave clock signal (clk2) 582 allows the two signals to be distributed across all master slave devices with inherent synchronization and effectively no delay between devices. In this example, the result of the embedding operation is a (distributed and received modulated) differential master-slave clock signal 584. In this example, master-slave distribution and synchronization circuit 560 uses a RFS modulator 562 (implemented in, say, a LVDS transmit circuit) to embed the chirp start (RFS_in) signal 580 into the master-slave clock signal (clk2) 582, and a RFS demodulator 564 (implemented in, say, a LVDS receive circuit) to respectively de-embed (e.g. demodulate) the differential master-slave clock signal 584 into a slave RFS_out signal 590 and a master-slave slave clock signal 588. Similarly, in the master device, a fed back (distributed and received modulated) differential master-slave clock signal 584 is also received in master-slave clock distribution and synchronization circuit 560.

In response to a serial-parallel interface (SPI) command coming from the MCU 214, the digital controller 516 of the master device 510 provides a chirp start signal (rfs_in) 580 that will be used by each master device 510 and slave device 520, 523 of the radar unit 505. The rfs_in signal 580 is provided to the master-slave clock distribution and synchronization circuit 560, and it is embedded on the master-slave clock signal (clk2) 582 by the RFS modulator 562. In this example, the RFS modulator 562 is an LVDS transmitter circuit that produces a modulated/embedded output LVDS signal. In one example, as illustrated, the modulated/embedded output LVDS signal may be a differential master-slave clock synchronization signal with embedded RFS signal 584 (MSclk_n & MSclk_p). In this example, the RFS modulator 562 (and RFS demodulator 564) may be terminated by a 100 ohms differential resistor (T), as well as all other slave LVDS clock RFS demodulators, in order to reduce any reflections due to LVDS link asymmetry, which may corrupt the signal integrity and cause false zero crossings.

In accordance with examples of the invention, the differential master-slave clock synchronization signal with embedded RFS_in signal 584 (i.e. containing both clock & chirp start) may then be propagated to a number/all devices of the radar unit 505 via an equal length (L2) star connection and splitter 587, in order to limit any printed circuit board (PCB) skew or PCB asymmetries to very low values (e.g. of the order of <100 psec).

In this example, each radar slave device 520, 523 includes a digital controller 526 and a transmitter circuit 522 comprising one to several transmitter channels (TX_CH) and a receiver circuit 524 comprising one to several receiver channels (RX_CH). The slave device 520 further includes one or several ADC(s) 541 that is/are coupled to the one to several receiver channels (RX_CH) 524 as well as a serial interface 534. In accordance with examples of the invention, the slave device 520 further includes a slave-based master-slave clock distribution and synchronization circuit 561, where only the LVDS receiver is enabled. In this example, the slave-based master-slave distribution and synchronization circuit 561 is configured to demodulate and extract the chirp start (RFS) signal 580 from the differential master-slave clock synchronization signal with embedded RFS_in signal 584. In this example, slave-based master-slave distribution and synchronization circuit 561 uses an RFS demodulator 564 implemented in LVDS.

In some examples, as appreciated by a skilled person, the slave device 520 may be configurable as a master device 510, but with a number of circuits or components or functionality disabled. For example, in such a slave device 520, since the clock and sync signal as well as LO signals are received from the master device 510, a slave reference PLL, main PLL and the MS_CLK transmit circuits are disabled. Many other blocks may be present inside the slave device, but are not mentioned herein to avoid obfuscating concepts of the invention.

The respective RFS slave demodulator 564 is configured to extract respective slave clock signals (clk_rxS 588) in a CMOS format with very low delay variation between that clock and the master clock signal (clk_rxMS 585). In addition, the respective RFS demodulators 564, 565 are configured to demodulate the transmitted chirp start signal (rfs_in 580) in each respective device. Since the respective RFS master modulator 585, generates the clock signal (clk_rxM) and RFS master demodulator 565 and RFS slave demodulator 564 demodulate the respective master clock signals (clk_rxM 585) and slave clock signals (clk_rxS 588) that are very closely aligned, they are used to re-sample the respective master (rfs_outM) 586 and slave (rfs_outS) 590 device chirp output signals. In this manner, the RFS master demodulator 565 and RFS slave demodulator 564 create synchronized chirp start signals (rfsSync_M 592, rfsSync_S 594) at respective inputs at time engines 570, 572. In this example, in the slave device, this sampling operation is performed in the digital domain, inside respective digital controller 526, by flip-flop 532. In the master device, this sampling is performed inside digital controller 516, by flip-flop 530.

A skilled artisan will appreciate that many other circuits, components and blocks may be present inside a master device 510 and slave device 520, but that these have been omitted purely for clarity purposes. In this manner, a system, such as a phased array FMCW imaging radar system, employing example embodiments of the invention relating to a master-slave arrangement, may be able to benefit from improved clock synchronization accuracy in a multiple chip configuration.

In some examples, the master device 510 is configured to generate and distribute a master-slave clock 584 from a MS_clock LVDS transmit modulator 526 path to the MS_clock LVDS receive path inside slave devices, and back to master device LVDS RX demodulator 564, in, say, a star configuration. In this manner, in some examples, an ADC clock applied to both master device(s) and slave devices may be perfectly aligned, so long as the transmission line length to each of the receivers is matched. Furthermore, in some examples, the clock signal with an embedded start of a frame indication may be used to sample the data inside different ADCs belonging to different ICs, in order to reduce phase error and consequently angle resolution at sensor level.

Also for example, in one embodiment, the illustrated examples of a master device 510 or slave device 520 may be implemented as circuitry located on a single integrated circuit 598, 599. Alternatively, the circuit and/or component examples may be implemented as any number of separate integrated circuits 598, 599 interconnected with each other in a suitable manner. The specifications and drawings are, accordingly, to be regarded in an illustrative rather than in a restrictive sense.

Figure 6:
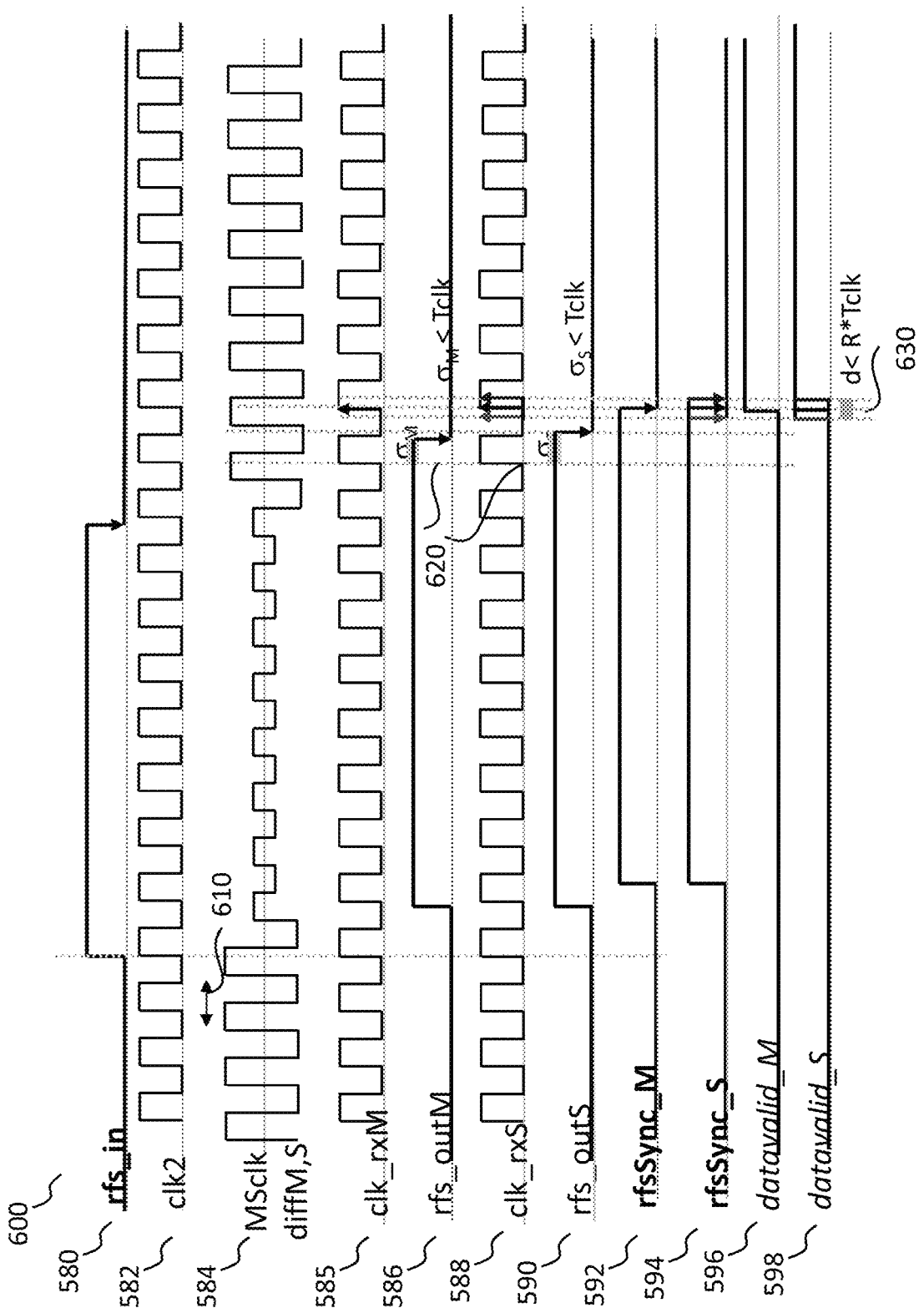
FIG. 6 illustrates a timing diagram of a synchronization method, according to example embodiments of the invention.

Referring now to FIG. 6 (and with reference to FIG. 5), a timing diagram 600 of a synchronization method between master device and one or more slave device(s) is illustrated, according to example embodiments of the invention. In order to obtain phase coherence in, say, a master-slave arrangement based radar unit, such as radar unit 505 of FIG. 5, local oscillator (LO) and clock signals are shared between all devices of the radar unit. In accordance with examples of the invention, the LO signal is provided from the master device (via a LO_out path/pin 518) to each LO_in path/pin 519, 529 present in both master device(s) 510 and slave device(s) 520, 523. In this case, LO_out signal is star routed using equal length (L) transmission/communication lines and power splitters to guarantee phase aligned signals.

The reference clocks are generated on master device 510 using the reference PLL clock signal (clk2) 582, tied to an external crystal oscillator 552, and sent to RFS modulator 560. Under, say, a SPI command from the MCU 414, the digital controller 516 of the master device 510 provides a chirp start (RFS_in) signal 580 to the RFS modulator circuit 560, which is configured to embed (e.g. encapsulates) the chirp start (RFS_in) signal 580 into the master-slave clock signal (clk2) 582 received from reference PLL 550. In this example, the embedded chirp start (RFS_in) signal 580 takes a form of differential master-slave clock signal (MS_clkdiff) 584, which is then used by all the master device(s) 510 and slave devices 520 of the system. In FIG. 5, the RFS modulator circuit 560 may be an LVDS transmitter and the differential master-slave clock signal (MS_clkdiff) 584 may take a form of an LVDS signal, MSclk_n & MSclk_p.

In some examples, the use of LVDS facilitates programmability of output voltages and supports very high data speeds. In some examples, LVDS may be employed in order to reduce interference or signal pollution between supplies due to current spikes if CMOS logic were used.

This differential master-slave clock signal (MS_clkdiff) 584 containing clock & chirp start is then transmitted by the master device 510 to all devices of the system, and is received by both master device(s) 510 and slave devices 520. Master-slave clock distribution and synchronization circuits 560, 561 are configured to extract the clock signals (clk_rxM 585 & clk_rxS 588) in a CMOS format with very low delay variation between both clocks, as well as to demodulate the transmitted chirp start signal (RFS_in) 580 in both the master device(s) 510 (to produce a reproduced chirp start signal rfs_outM 586) and slave devices 520 (to produce a reproduced chirp start signal rfs_outS 590). Since the respective clock signals present a very good alignment, as illustrated, advantageously with very low absolute delay and delay variations, they are used to re-sample the reproduced chirp start signals rfs_outM 586 & rfs_outS 590. In this manner, synchronized chirp start signals (rfsSync_M 592 and rfsSync_S 594) are created at inputs to the respective time engines 570, 572. In some examples, this sampling is performed in the digital domain, inside digital controller 516, 526 by flip-flops 530, 532.

In some examples, in order to obtain this re-sampling in a digital domain, at least one of the at least one master device clock receiver and demodulator 560, and at least one slave device clock receiver and demodulator 561 may be arranged such that clock extraction circuitry that generate signals (clk_rxM, clkrxS) do not introduce a problematic delay (GM, GS 620) due to, say, any of process, voltage, temperature (PVT) variations, for example where the variations during a communication unit design phase are constrained to be smaller than one clock cycle (Tclk) 610, to avoid introducing re-sampling errors on RFS_signals (rfs_outM, rfs_outS). In some examples, a clock extraction circuitry generates signals (clk_rxM, clkrxS) that are only allowed to introduce a delay (σM, σS<Tclk 620) of up to half of a clock period of the system clock signal (388, 585) due to any of process, voltage, temperature, PVT variations. The inventors of the present invention have identified that a more acceptable ratio is one eighth of a clock period delay of the system clock signal 588, 585. Any variability is well controlled to guarantee that the datavalid signals (datavalidM 596, datavalidS 598), which are used to set sampling time of data at ADC side, are accurately time aligned on all master device(s) and slave devices, with a maximum delay (d) defined by the overall radar phase variation specification (d=<R*Tclk) 630.

In one example operation, it is envisaged that the radar units that include a built-in inter-chip localization feature may be employed in radar units in vehicles. Examples of the invention may be additionally employed to support beam steering control in a phased array radar system across multiple sensors, in some examples having multiple chips.

Examples of the invention propose a method for clock distribution and synchronization in a communication unit having at least one master device and at least one slave device configured in a master-slave arrangement and configured to process at least one of: transmit signals, and receive signals. The method includes, at a master device: generating a system clock signal and generating a frame start signal. The method further includes embedding the frame start signal into the system clock signal to produce a modulated embedded master-slave clock signal. The modulated embedded master-slave clock signal is then transmitted to at least one slave device to synchronise the system clock signal and a frame start signal between the at least one master device and at least one slave device.

Figure 7:
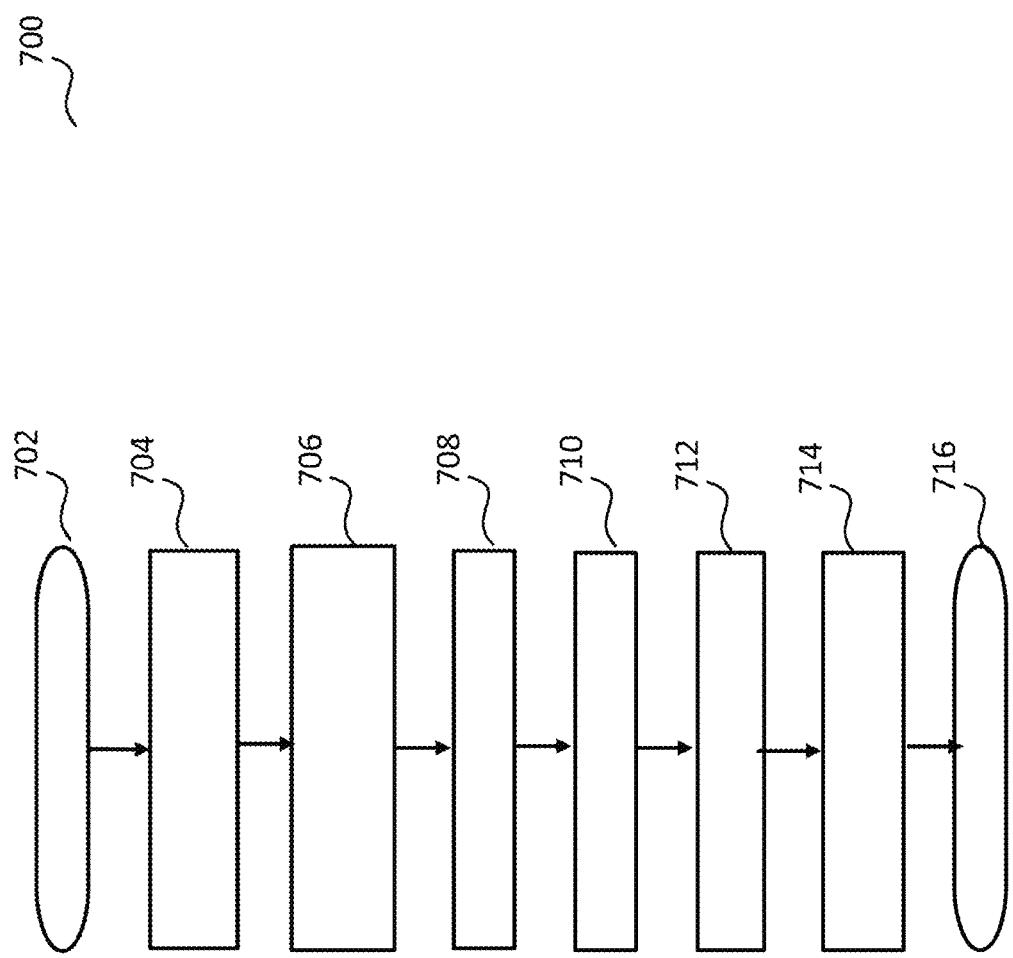
FIG. 7 illustrates an example flowchart of the steps associated with synchronization across multiple master device(s)-slave device(s), according to example embodiments of the invention.

Referring now to FIG. 7 an example flowchart 700 of the steps associated with synchronization across multiple master device(s)-slave device(s) is illustrated, according to example embodiments of the invention. The flowchart starts at 702, with a start-up of at least the master device and/or a MCU. At 704, the reference phase locked loop (PLL) of the radar unit is initiated. In some examples, at 704, a clock signal is sent to master device(s) and slave device(s) and the MCU. In one example at 706, a main PLL is initiated and a waveform generator of a master device controls its VCO to output a LO signal with a fixed frequency that is proportional to a chirp start frequency, $f_{start\_master}$. In one example application, one or more slave device(s) are initiated to receive the signal from the master device, and accordingly adjust their LO frequency to be the same as that in the master device.

In examples of the invention, at 708, a master device starts a FMCW ramp signal and embeds a RFS_in signal within a MS clock signal. In some examples, the MS clock signal is then sent to all other master device(s) and slave device(s). At 710, the MS clock signal with an embedded RFS_in signal is received and demodulated in each of the master device(s) and slave device(s). At 712, the ramp (chirp) signal starts in each of the master device(s) and slave device(s). At 714, each of the master device(s) and slave device(s) receive a representation of an echo signal and send validated, demodulated data to the MCU based on the synchronised clock signal with an embedded RFS_in signal. In this manner, synchronization between the master device(s) and slave device(s) is achieved, after which, all the master device(s) and slave device(s) have the same frequency chirp start and chirp end frequencies, as well as the same sampling clock. The data sampled by all of the devices (or ICs) including the ADC is now substantially synchronous. The flowchart ends at 716.

In order to facilitate an embedding of a frame start signal, such as a RFS signal, into a clock signal, such as a master-slave clock signal in a master-slave architecture, particularly one that employs differential signalling such as LVDS, an example LVDS transmitter is proposed in FIG. 8. In some examples, the proposed example LVDS transmitter may be configured to support programmability of driver output current, which is dependent on the number of termination loads (i.e. the number of receiving RFS demodulators and a value of a resistive termination load coupled between the differential output of the RFS modulator. In some examples, the proposed example LVDS transmitter may be configured to support programmability of driver currents and particularly a maximum current to minimum current amplitude ratio, dependent on the LVDS receiver and demodulator employed in other slave devices and master device(s). In some examples, the proposed example LVDS transmitter may be configured to support in-phase transition high-low-high detection of a chirp-start on the MS clock, in order to avoid erroneous demodulation at LVDS receiver and & demodulators.

In some examples, the architecture has been designed to be able to program the absolute value of the LVDS TX current (for example according to a number of LVDS receiver loads), in such a way that the voltage is constant ($V_{max}$, $V_{min}$) at the LVDS receiver side. This is advantageous because in the LVDS receiver the maximum voltage $V_{max}$ needs to be above a certain level in order to not degrade the LVDS receiver phase noise, and above a minimum value in order to be able to detect the low to high transition (when demodulating the embedded RFS signal). Furthermore, in some examples, it is advantageous for $V_{min}$ to also be above a safety threshold level (Vth_safety).

Referring now to FIG. 8, an example LVDS transmitter and modulator configured to embed a RFS signal (such as a Chirp Start) into a clock signal (such as a master-slave clock signal), is illustrated according to example embodiments of the invention. The RFS modulator 562 is composed of two complementary drivers 810, 830, a controller 850 and a single common mode pair of resistors 860. In examples of the invention, the controller 850 is configured to enable or disable a respective one of the complementary drivers 810, 830 according to a received RFS signal, e.g. a chirp start signal, which is provided to the controller 850. In response to the arrival (or not) of the RFS signal the controller 850 is configured to change the output current value, and therefore the output voltage.

In the illustrated example, the controller is configured to provide four alternative logic control signals (two output from XOR gates 854 having input clock 851 and RFS 852 or input clock 851 and ground 853 inputs; and two inverted representations thereof, output from invertors 856). In the illustrated example, the four alternative logic control signals from the controller 850 are used to activate or deactivate switches 812, 814, 816, 818 in the first driver 810 or switches 832, 834, 836, 838 in the second driver 830. In this manner, the proposed example LVDS transmitter may be configured to support in-phase transitions, e.g. high-low-high detection, of a chirp-start on the MS clock, during a modulation phase, to avoid erroneous demodulation at LVDS receiver and & demodulators.

In some examples of the invention, it is envisaged that the AM levels associated with the embedded RFS (or chirp start) signal may be programmable in the RFS modulator in the master device 510. In one example, as illustrated in FIG. 8, the maximum output voltage is obtained when both drivers 810, 830) are activated (i.e. turned 'ON'), as expressed in Eqn. [1] below.

$$\text{Maximum output voltage swing } (A\max(voutp,n))=m*I*R \quad [1]$$

where 'm' is a number of driver units used.

Alternatively, a minimum output voltage is obtained when, say, a first driver 810 is activated (i.e. turned 'ON'), whilst the second driver 830 is deactivated (i.e. turned 'OFF'), as expressed in Eqn. [2] below:

$$\text{Minimum output voltage swing: } =>A\min(voutp,n)=R=m*I*R*(2k-1) \quad [2]$$

when the first driver 810 is activated (i.e. turned 'ON'), whilst the second driver 830 is deactivated (i.e. turned 'OFF').

In some examples, the number of termination loads may be programmable, thereby enabling a designer to set a programmable output voltage, for a constant A max/A min ratio. Thus, in some examples, the proposed example LVDS transmitter may be configured to support programmability of driver output current, dependent on the number of termination loads. For example, and depending upon the number of termination loads that are selected (where typically there may be one termination load for each device), the designer (or controller) may increase the current to achieve the same voltage based on a lower resistance, due to the parallel nature of the termination load resistors. Thus, if we assume that one embodiment includes a single master device and a single slave device, both devices have a 100 ohms resistor inside the LVDS RX, which equates to a 50 ohm load because they are arranged in parallel.

In some examples, the value 'k' selects a ratio between the A max voltage level and A min voltage level, noting that the maximum voltage A max is a constant voltage.

The ratio between the A max and A min voltage levels is shown in Eqn. [3] below:

$$\text{Voltage Ratio} = A\max/A\min = \{m*I*R\}/\{m*I*R*(2k-1)\} = 1/(2k-1) \quad [3]$$

According to a required ratio between both maximum and minimum currents (and consequently maximum and minimum signal amplitudes, A max/A min), the parameter 'k' may be calculated as illustrated in Eqn. [4].

$$k = (\tfrac{1}{2})*[1+1/\text{ratio}] \quad [4]$$

In this manner, 'k' different current sources (k*I) are selected in the first driver 810 to be activated (i.e. turned 'ON'), whilst (1−k) current sources (1−k)*I are selected in the second driver 830 to be activated (i.e. turned 'ON'). In this manner, the proposed example LVDS transmitter may be configured to support programmability of each of the drivers as well as programmably control the modulator maximum current to minimum current amplitude ratio. In some examples, this is made dependent on the LVDS receiver and demodulator employed in the slave device(s) and master device(s).

In one example, the value 'k' may be set to ¾. In this instance, the maximum output voltage swing when both drivers are 'ON', equation [2] may be defined as below in equation [5]:

$$\text{Maximum output voltage swing } (A\max(voutp,n)) = [(¾)*I+(¼)*I]*R = I*R \quad [5]$$

In this instance, the minimum output voltage swing when both drivers are 'ON', results in equation [6] below:

$$\text{Minimum output voltage swing } (A\min(voutp,n)) = [(¾)*I-(¼)*I]*R = I/2*R \quad [6]$$

In addition to the above example for programming the maximum and minimum signal amplitude ratio (via the 'k' parameter), some examples of the invention also propose to program, via selection of parameter 'm' for both the left side first driver 810 and the right-side second driver 830, the absolute values of the (minimum and maximum) output currents, keeping the ratio between them as a constant.

In some examples, the selection of 'm' may be dependent on a number of resistive terminations used in the cascading system (connected in parallel), as a goal to keep constant the output voltage swing and as seen at each LVDS receiver input, above a minimum voltage limit. In some examples, this minimum voltage limit may be determined by a minimum voltage needed at LVDS receiver input in order to guarantee a given phase noise at LVDS receiver output clock.

Thus, by control of the activation or deactivation of one of the driver circuits, e.g. the second driver circuit 830, dependent upon the level of the RFS input signal 852, a multiple amplitude signal can be output from a RFS modulator of a master device, effectively forming the distributed, modulated differential master-slave clock signal 584, with an embedded RFS signal 852. In some examples, the chirp-start amplitude modulation contained within the distributed, modulated differential master-slave clock signal 584 may be configurable to transition between values of A max and A min, as shown and according to example embodiments of the invention.

Figure 9:
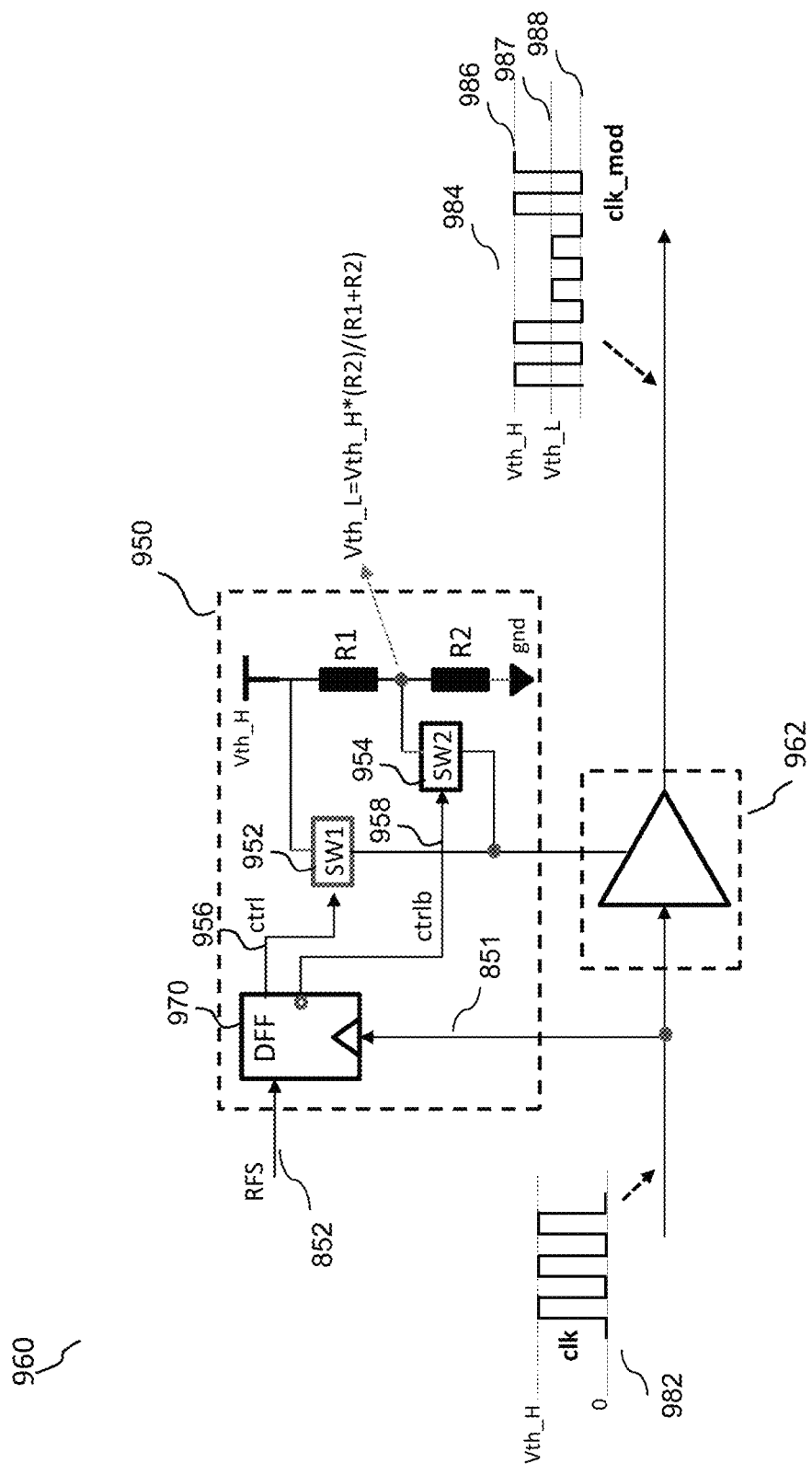
FIG. 9 illustrates an example CMOS single-ended transmitter and modulator configured to embed a RFS signal (such as a Chirp Start) into a clock signal (such as a master-slave clock signal), according to example embodiments of the invention.

Referring now to FIG. 9, an example CMOS single-ended transmitter and modulator configured to embed a RFS signal (such as a Chirp Start) into a clock signal (such as a master-slave clock signal) is illustrated, according to example embodiments of the invention. As will be appreciated by a skilled artisan, there are a number of ways that the concepts herein described may be implemented within certain technology processes, and the example CMOS single-ended transmitter and modulator of FIG. 9 is very different to an example approach adopted in FIG. 8 for an example LVDS transmitter and modulator configured to embed a RFS signal (such as a Chirp Start) into a clock signal (such as a master-slave clock signal).

One example of an alternative CMOS transmitter and RFS modulator 960 is presented in FIG. 9, although it is envisaged that other implementations and circuit designs are possible to employ the concepts herein described. In the CMOS transmitter and RFS modulator 960, a CMOS buffer 962 is coupled to a RFS modulator circuit 950 and designed in such a way that it is always able to provide, from a simple input clock signal (e.g. a two logic level clock signal, 982), a modulated clock signal having, say, three logic levels, 984 at its output. In some examples, this CMOS buffer 962 design provides a reduced (or minimum delay variation), and the output modulated three logic level clock signal includes different supply voltages Vth_H 986, Vth_L 987 and zero 988. These three voltages 986, 987, 988 are generated by RFS modulator circuitry 950, according to equation [7], $$Vth\_L = Vth\_H*(R2)/(R1+R2) \quad [7]$$

In this example, the selection to move from one voltage to another (e.g. Vth_H 986 to Vth_L 987 and vice versa, resulting in a RFS modulation signal being superimposed on the input clock signal 982), is performed according to the input RFS signal 852 and the configuration of switches SW1, 952 and SW2 954. In this example, these switches are controlled by synchronized control signals (ctrl 956, ctrlb 958) that are generated through flip-flop circuit DFF 970, whose outputs are triggered by the timing of the input clock signal 982. When moving from one logic level to another (e.g. Vth_L 987 to Vth_H 986 and vice versa), examples of the invention ensure that the voltage level reaches its maximum value (i.e. including any settling time) in less than ¼ of the clock period (Tclk) of the input clock signal 982.

Although examples of the invention are described with reference to a CMOS single ended embodiment of RFS modulator circuit 950, it is envisaged that logic level modulation implementations or circuits may be used. In the illustrated CMOS single ended embodiment of RFS modulator circuit 950 and other envisaged logic level modulation implementations or circuits, the goal is to provide (at least) a $3^{rd}$ logic level (e.g. Vth_L), which is different from '0' and high (Vdd), in which the transitions (from Vth_H to Vth_L or Vth_L to Vth_H) represent the embedding of the RFS signal. In a receiver sense, the envisaged logic level modulation implementations or circuits need to be designed such that the generated $3^{rd}$ logic level can be detected by a CMOS receiver and demodulation circuitry.

Figure 10:
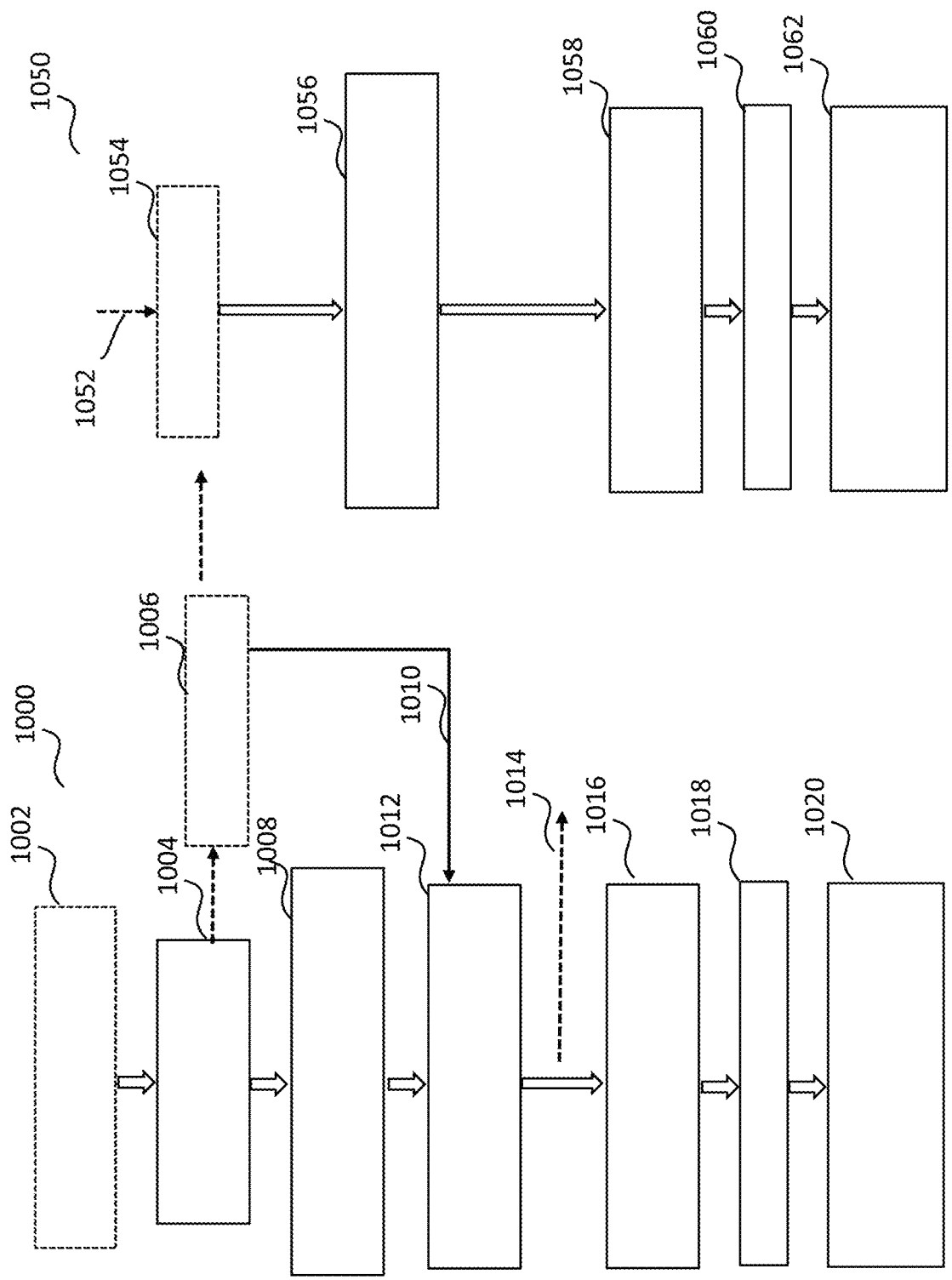
FIG. 10 illustrates an example flowchart of the operation of a master device and a slave device in a FMCW radar unit, according to example embodiments of the invention.

Referring now to FIG. 10, an example flowchart 1000 of the operation of a master device and a slave device in a FMCW radar unit is illustrated. In examples of the invention, the master device may employ LVDS (or single-ended) transmitter and modulator circuit configured to embed a RFS signal (such as a Chirp Start) into a clock signal (such as a master-slave clock signal), for example operations performed at 708-712 in FIG. 7, according to example embodiments of the invention.

In a master device, at 1002, the master device (say master device 510 from FIG. 5) starts, for example when a signal is provided by XTAL inputs, a start master digital controller starts and, in some LDVS examples, a startup sequence causes a number of termination loads in the system to be determined such that a LVDS TX current can be set. At 1004, a reference PLL is started, such that a master-slave clock signal is sent to the RFS modulator. In some examples, this results in a LVDS TX_RX (clk2) signal being generated (from FIG. 5), such that the master-slave clock signal (MSclk_n, Msclk_p) is sent to each master device and slave device. In addition, in some examples, the master-slave clock signal is also sent to the MCU. Furthermore, in some examples, the master-slave clock signal is also sent to the main PLL (i.e. as clk1 from FIG. 5) inside the master device.

At 1006, the MCU starts. At 1008 the main PLL is started, which results in LO in/LO out signals appearing at the ports of the master device. The Master device transmit, receive, ADCs and interfaces, etc. are also started. At 1010 FMCW a ramp step/slope operation is programmed by the MCU via a serial-to-parallel interface (SPI), in some examples. At 1010, in the master device, an RF demodulator circuit may also be started, in order to receive and demodulate a modulated differential (or single-ended) master-slave clock signal with an embedded RFS synch signal 584.

At 1012, a RFS modulator circuit is started and a RFS synch signal (e.g. a chirp start signal in a FMCW radar unit) is received from a digital controller. The RFS modulator circuit embeds the RFS synch signal into a master-slave clock, in either a differential signal or single-ended form, and at 1014 distributes the modulated differential master-slave clock signal with an embedded RFS synch signal 584, (or modulated single-ended master-slave clock signal with an embedded RFS synch signal 984) to other slave devices and master device(s) (if so configured). As illustrated in FIG. 8 or FIG. 9, the embedded RFS_synch signal, e.g. a chirp start signal, is used to start a modulation function on all devices, and has been embedded in a system clock signal via a RFS modulator 562 of a LVDS master-slave distribution and synchronization circuit 560 or a CMOS single-ended transmitter and modulator 960.

In some examples, the distributed, modulated differential master-slave clock signal 584 or distributed, modulated single-ended master-slave clock signal 984 is provided by the master device, and PCB routed in a star connection manner in order to guarantee a same delay of the clock signal across each of the receiving devices.

At 1016, at the master device, a RFS demodulator circuit receives the embedded MS clock (clk_rxM) and demodulates (de-embeds) the RFS signal (rfsSync_M) contained therein. In this example, at 1018, a communication starts, in a form of a ramp signal in the master device. At 1020 the master device is able to receive radar signals and send synchronized valid data to MCU.

In some examples, the LVDS or CMOS single-ended receiver modulator operations performed at 1012 may be supplemented with a programming operation of an AM level that is configurable to transition between values of A max and A min, as described in FIG. 8.

Referring also to FIG. 10, an example flowchart 1050 of the operation of a slave device in a FMCW radar unit is illustrated. At 1052, the slave device is waiting for an embedded clock signal from the master device. At 1054 the slave device starts, for example when a clock signal is received at CLK_RX&DEMOD, and a slave Digital Controller is started. At 1056, at the slave device, the LO circuits in the transmit, receive and the ADC circuit(s) and interfaces are started. At 1058, at the RFS demodulator circuit of the slave device, the embedded MS clock (clk_rxM) is received and is demodulated (de-embedded) to extract the RFS signal (rfsSync_M) contained therein (clk_rxS; rfsSync_S). At 1060, a ramp signal starts in the slave device. At 1062, the slave device receives a radar signal and is able to send synchronized valid data to MCU.

In this manner, synchronization between the master device(s) and slave device(s) is achieved, after which, all the master device(s) and slave device(s) have the same frequency chirp start and chirp end frequencies, as well as the same sampling clock. The data to be re-sampled by all of the devices (or ICs) including the ADC is now substantially synchronous.

Thus, examples of the invention describe a communication unit (such as a radar unit) that includes a plurality of cascaded devices that comprise at least one master device and at least one slave device configured in a master-slave arrangement and configured to process at least one of: transmit signals, and receive signals. The at least one master device includes: a clock generation circuit; a modulator circuit coupled to the clock generation circuit and configured to receive a system clock signal and a frame start signal. The at least one master device is configured to embed the frame start signal (for example a chirp signal) into the system clock signal to produce a modulated embedded master-slave clock signal. The at least one master device transmits the modulated embedded master-slave clock signal to the at least one slave device to synchronise the system clock signal and a frame start signal between the at least one master device and the at least one slave device. In other examples, at least one master device may be employed with any number of slave devices. In this situation, the at least one master device and one or more slave device(s) may present a different number of receiver and transmitters channels. The slave devices can be programmed to have only receive channels on, whilst the transmit channels are enabled by the master device.

Although examples of the invention are described with reference to a radar unit suitable for an automotive application, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A communication unit comprising:
   a plurality of cascaded devices that comprise at least one master device and at least one slave device configured in a master-slave arrangement;
   wherein the communication unit is characterized in that:
   the at least one master device comprises:
      a clock generation circuit configured to output a system clock signal;
      a modulator circuit coupled to the clock generation circuit and configured to receive the system clock signal and a frame start signal and embed the frame start signal into the system clock signal to produce a modulated embedded master-slave clock signal; and
      transmit the modulated embedded master-slave clock signal to the at least one slave device to synchronise the system clock signal and the frame start signal between the at least one master device and at the least one slave device.

2. The communication unit of claim 1 wherein the modulator circuit comprises at least two complementary drivers operably coupled to a controller wherein the controller is configured to control an output current of each of the at least two complementary drivers according to the received frame start signal.

3. The communication unit of claim 2 wherein the at least two complementary drivers each comprise at least two pairs of switches, each pair of switches configured to receive a first control signal and a second control signal from the controller.

4. The communication unit of claim 2, wherein the controller comprises a plurality of XOR logic components wherein a first XOR logic component receives the frame start signal and a clock signal and outputs a first control signal to a first complementary driver and a second XOR logic component receives a reference signal and the clock signal and outputs a second control signal to a second complementary driver.

5. The communication unit of claim 4, wherein the controller comprises a pair of inverters respectively coupled to the output of the plurality of XOR logic components and respectively configured to generate a third control signal that is an inversion of the first control signal and generate a fourth control signal that is an inversion of the second control signal.

6. The communication unit of claim 1, wherein the at least one master device is configured to use differential signalling such that the modulated embedded master-slave clock signal takes a form of a differential modulated embedded master-slave clock signal.

7. The communication unit of claim 6 wherein the at least one master device is configured to use low-voltage differential signalling, LVDS, in embedding the frame start signal in the system clock signal.

8. The communication unit of claim 3 wherein the at least two complementary driver circuits are supplied with a current source controlled by complementary bias voltages wherein the controlled complementary bias voltages are configured to provide embedded frame start amplitudes on the modulated embedded master-slave clock signal of an amplitude level that is expected by each RFS demodulator of a number of slave device(s) and master device(s).

9. The communication unit of claim 6, wherein the modulator is terminated by a 100 ohms differential resistor (T).

10. The communication unit of claim 1, wherein the at least one master device comprises a digital controller coupled to the modulator circuit and configured to re-sample a re-created frame start signal using a re-created system clock signal.

11. The communication unit of claim 1, wherein the communication unit is a radar unit and the frame start signal is a chirp start signal.

12. An integrated circuit for a master device in a master-slave arrangement, wherein the integrated circuit is characterized by a modulator circuit configured to:
   receive a system clock signal and a frame start signal;
   embed the frame start signal into the system clock signal to produce a modulated embedded master-slave clock signal; and
   transmit the modulated embedded master-slave clock signal to at least one slave device to synchronise the system clock signal and the frame start signal between the at least one master device and the at least one slave device.

13. A method for clock distribution and synchronization in a communication unit having at least one master device and at least one slave device configured in a master-slave arrangement and configured to process at least one of: transmit signals, and receive signals, wherein the method comprises, at a master device:

receiving a system clock signal and a frame start signal;

embedding the frame start signal into the system clock signal to produce a modulated embedded master-slave clock signal; and transmitting the modulated embedded master-slave clock signal to the at least one slave device to synchronise the system clock signal and the frame start signal between the at least one master device and the at least one slave device.

\* \* \* \* \*